United States Patent
Togawa et al.

(10) Patent No.: US 9,672,809 B2
(45) Date of Patent: Jun. 6, 2017

(54) SPEECH PROCESSING DEVICE AND METHOD

(71) Applicant: FUJITSU LIMITED, Kawasaki-shi, Kanagawa (JP)

(72) Inventors: Taro Togawa, Kawasaki (JP); Chisato Shioda, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/260,449

(22) Filed: Apr. 24, 2014

(65) Prior Publication Data

US 2014/0372121 A1   Dec. 18, 2014

(30) Foreign Application Priority Data

Jun. 17, 2013 (JP) ................................. 2013-126303

(51) Int. Cl.

| | | |
|---|---|---|
| G10L 13/027 | (2013.01) | |
| G10L 15/02 | (2006.01) | |
| G10L 15/04 | (2013.01) | |
| G10L 15/08 | (2006.01) | |
| G10L 21/0364 | (2013.01) | |
| G10L 21/057 | (2013.01) | |

(52) U.S. Cl.
CPC ............ *G10L 13/027* (2013.01); *G10L 15/02* (2013.01); *G10L 15/04* (2013.01); *G10L 15/08* (2013.01); *G10L 21/0364* (2013.01); *G10L 21/057* (2013.01)

(58) Field of Classification Search
CPC ...... G10L 15/187; G10L 15/02; G10L 15/063; G10L 15/08; G10L 13/027
See application file for complete search history.

(56) References Cited

U.S. PATENT DOCUMENTS

| 4,852,172 A | 7/1989 | Taguchi | |
|---|---|---|---|
| 4,920,568 A * | 4/1990 | Kamiya | .................. G10L 25/78 704/233 |

(Continued)

FOREIGN PATENT DOCUMENTS

| CN | 102436807 A | 5/2012 |
|---|---|---|
| JP | 62-54297 | 3/1987 |

(Continued)

OTHER PUBLICATIONS

Extended European Search Report issued Nov. 18, 2014 in corresponding European Patent Application No. 14166346.8.

(Continued)

*Primary Examiner* — King Poon
*Assistant Examiner* — Ibrahim Siddo
(74) *Attorney, Agent, or Firm* — Staas & Halsey LLP

(57) ABSTRACT

A speech processing device includes a processor; and a memory which stores a plurality of instructions, which when executed by the processor, cause the processor to execute: obtaining input speech, detecting a vowel segment contained in the input speech, estimating an accent segment contained in the input speech, calculating a first vowel segment length containing the accent segment and a second vowel segment length excluding the accent segment, and controlling at least one of the first vowel segment length and the second vowel segment length.

14 Claims, 14 Drawing Sheets

(56) References Cited

U.S. PATENT DOCUMENTS

| | | | |
|---|---|---|---|
| 5,220,629 A * | 6/1993 | Kosaka | G10L 13/07 |
| | | | 704/260 |
| 5,432,886 A | 7/1995 | Tsukada et al. | |
| 7,065,485 B1 | 6/2006 | Chong-White et al. | |
| 2003/0157468 A1 | 8/2003 | Kasahara | |
| 2008/0044048 A1* | 2/2008 | Pentland | H04S 1/007 |
| | | | 381/315 |
| 2010/0211376 A1* | 8/2010 | Chen | G10L 15/187 |
| | | | 704/2 |
| 2011/0071825 A1 | 3/2011 | Emori et al. | |
| 2012/0203553 A1 | 8/2012 | Maruta | |

FOREIGN PATENT DOCUMENTS

| | | |
|---|---|---|
| JP | 63-155200 | 6/1988 |
| JP | 3-273280 | 12/1991 |
| JP | 4-255900 | 9/1992 |
| JP | 6-110496 | 4/1994 |
| JP | 9-152889 | 6/1997 |
| JP | 2001-350500 | 12/2001 |
| JP | 2003-241644 | 8/2003 |
| JP | 2005-37423 | 2/2005 |
| JP | 2008-185911 | 8/2008 |
| JP | 2009-258366 | 11/2009 |
| JP | 4942860 | 5/2012 |
| JP | 5160594 | 3/2013 |
| WO | 2009/145192 A1 | 12/2009 |

OTHER PUBLICATIONS

Daniel Felps et al., "Foreign accent conversion in computer assisted pronunciation training", Speech Communication 51 (2009), 920-932.

Daniel Felps et al., "Foreign Accent Conversion Through Concatenative Synthesis in the Articulatory Doman", IEEE Transactions on Audio, Speech, and Language Processing, vol. 20, No. 8, Oct. 2012, pp. 2301-2312.

Qin Yan et al., "Analysis by Synthesis of Acoustic Correlates of British, Australian and American Accents", Acoustics, Speech, and Signal Processing, 2004. Proceedings. (ICASSP 2004), XP010717709, pp. 637-640.

Keiichi Tajima et al., "Effects of temporal correction on intelligibility of foreign-accented English", Journal of Phonetics (1997) 25, 1-24 XP055151147.

Office Action issued by the State Intellectual Property Office of the P.R. of China on Nov. 4, 2016 in corresponding Chinese patent application No. 201410213321.X.

Office Action issued by the Japanese Patent Office on Apr. 25, 2017 in corresponding Japanese Patent Application No. 2013-126303.

* cited by examiner

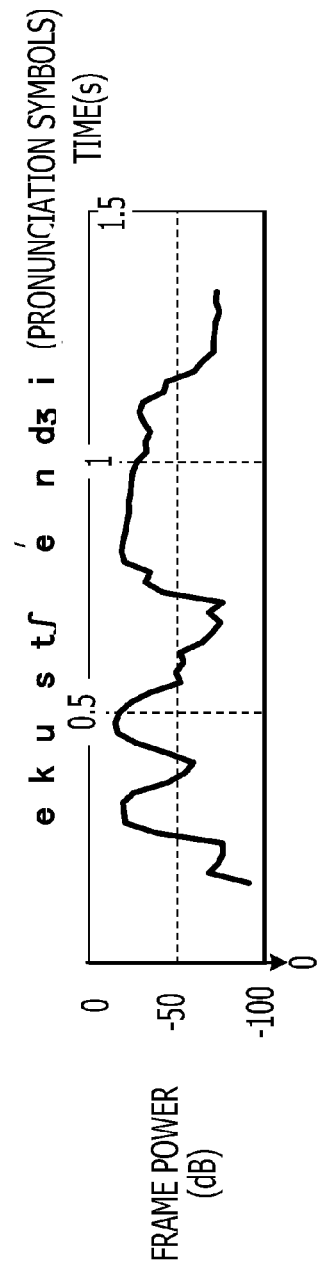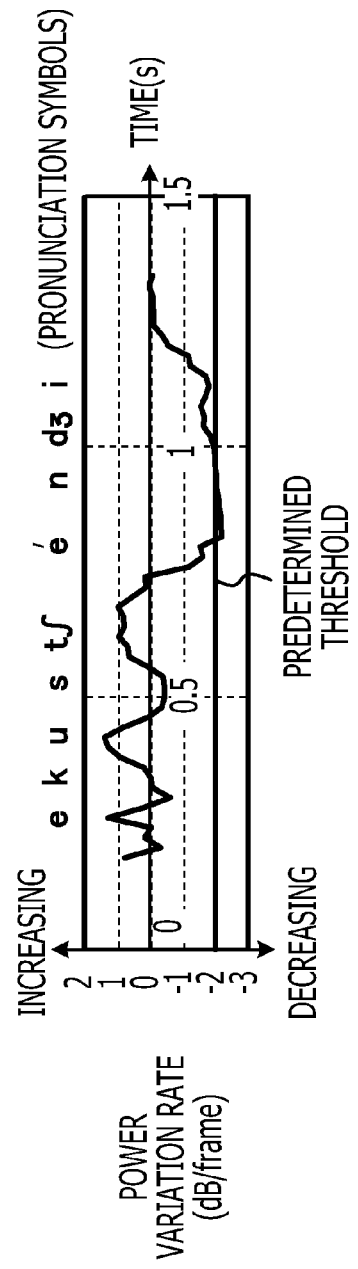

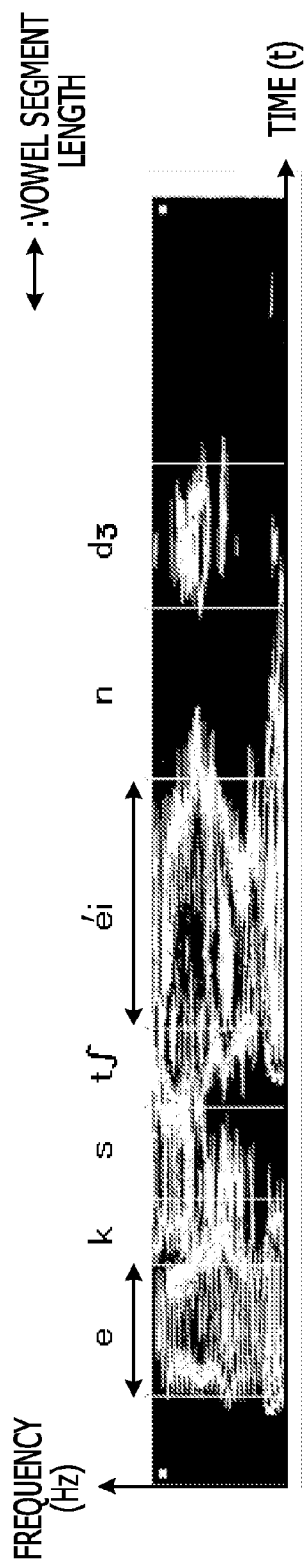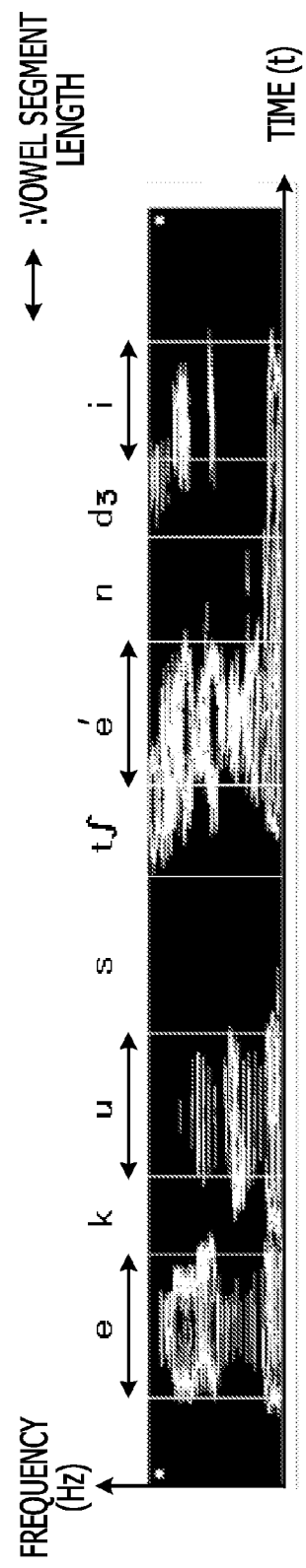

SPEECH PROCESSING DEVICE AND METHOD

CROSS-REFERENCE TO RELATED APPLICATION

This application is based upon and claims the benefit of priority of the prior Japanese Patent Application No. 2013-126303, filed on Jun. 17, 2013, the entire contents of which are incorporated herein by reference.

FIELD

The embodiments discussed herein is relate to a speech processing device, speech processing method, and speech processing program for controlling input signals, for example.

BACKGROUND

With recent advance in information processing devices and internationalization, it is increasingly common to make a telephone call in a foreign language through a telephone application installed in a personal computer, for example. In view of this trend, methods have been disclosed for controlling speech signals from a non-native speaker of a certain language so as to make his/her speech easier to understand by a native speaker of the language. For instance, Japanese Patent No. 4942860 discloses a technology for generating a phoneme label corresponding to input speech through speech recognition using an acoustic model, converting the phoneme label according to a specific conversion table, and producing synthesized speech from the converted phoneme label.

SUMMARY

In accordance with an aspect of the embodiments, a speech processing device includes a processor; and a memory which stores a plurality of instructions, which when executed by the processor, cause the processor to execute: obtaining input speech, detecting a vowel segment contained in the input speech, estimating an accent segment contained in the input speech, calculating a first vowel segment length containing the accent segment and a second vowel segment length excluding the accent segment, and controlling at least one of the first vowel segment length and the second vowel segment length.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4A illustrates the relationship between a sound segment and pitch frequency, while

FIG. 5A illustrates the relationship between a sound segment and power;

FIG. 5B illustrates the relationship between a sound segment and power variation rate;

FIG. 7A illustrates the relationship between a sound segment and the power spectrum of frequency bands for a native speaker's utterance;

FIG. 7B illustrates the relationship between a sound segment and the power spectrum of frequency bands for a non-native speaker's utterance;

DESCRIPTION OF EMBODIMENTS

Embodiments of a speech processing device, speech processing method, and speech processing program will be described below with respect to the accompanying drawings. Note that the embodiments are not intended to limit the disclosed technique.

First Embodiment

Figure 1:
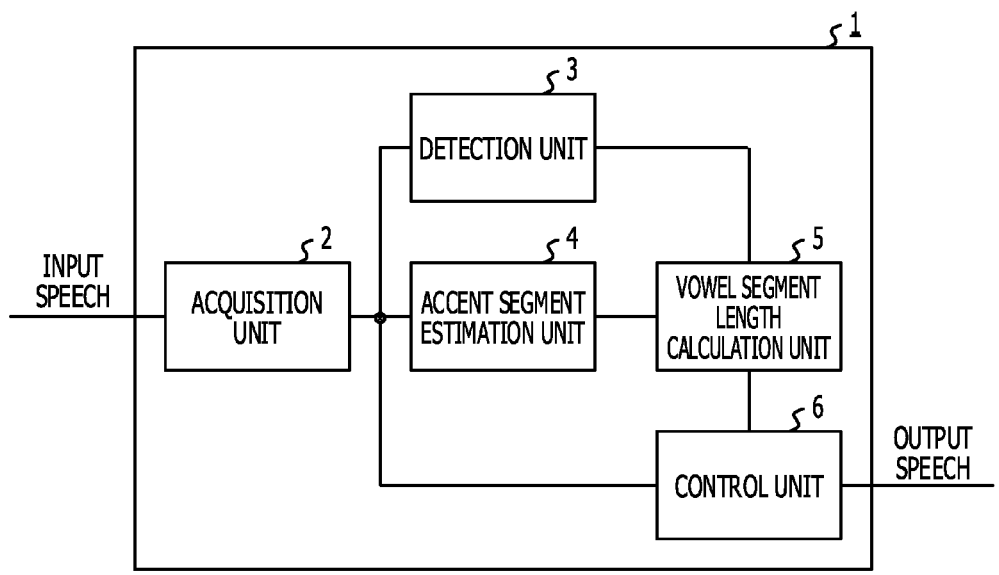
FIG. 1 is a functional block diagram of a speech processing device according to a first embodiment.

FIG. 1 is a functional block diagram of a speech processing device 1 according to a first embodiment. The speech processing device 1 includes an acquisition unit 2, a detection unit 3, an accent segment estimation unit 4, a vowel segment length calculation unit 5 (in other words, a vowel segment length specification unit 5), and a control unit 6.

The acquisition unit 2 is a hardware circuit composed of wired logic, for example. The acquisition unit 2 may also be a functional module realized by a computer program executed in the speech processing device 1. The acquisition unit 2 obtains input speech via a wired or wireless circuit, for example. Alternatively, the acquisition unit 2 may obtain input speech from a microphone not illustrated which is connected with or located in the speech processing device 1, for example. Input speech is English, for example, but it may be any other language. Also, input speech is a foreign language for the user, for example, but it may be the user's native language. For the purpose of description, the first embodiment assumes that the native language of the user who utters input speech is Japanese and input speech and output speech are English, and that the user who listens to the output speech is a native speaker of English. The acquisition unit 2 outputs the input speech it has acquired to the detection unit 3, the accent segment estimation unit 4, and the control unit 6.

The detection unit 3 is a hardware circuit composed of wired logic, for example. The detection unit 3 may also be a functional module realized by a computer program executed in the speech processing device 1. The detection unit 3 receives input speech from the acquisition unit 2. The detection unit 3 detects an exhalation segment, which indicates a sound segment included in the input speech. An exhalation segment is the interval from when the user inhales during utterance and starts utterance to when the user inhales again (in other words, the interval between a first breathing and a second breathing, or the interval during which the user is continuing utterance), for example. The detection unit 3 may detect average SNR, which is a signal-power-to-noise ratio serving as a signal quality indicator, from multiple frames included in input speech, and detect a segment in which the average SNR meets a certain condition as a sound segment (or an exhalation segment), for example. The detection unit 3 also detects an inhalation segment, which indicates a silent segment following the end of a sound segment included in the input speech. The detection unit 3 may detect a segment in which the average SNR does not meet the condition as a silent segment (or an inhalation segment), for example.

Figure 2:
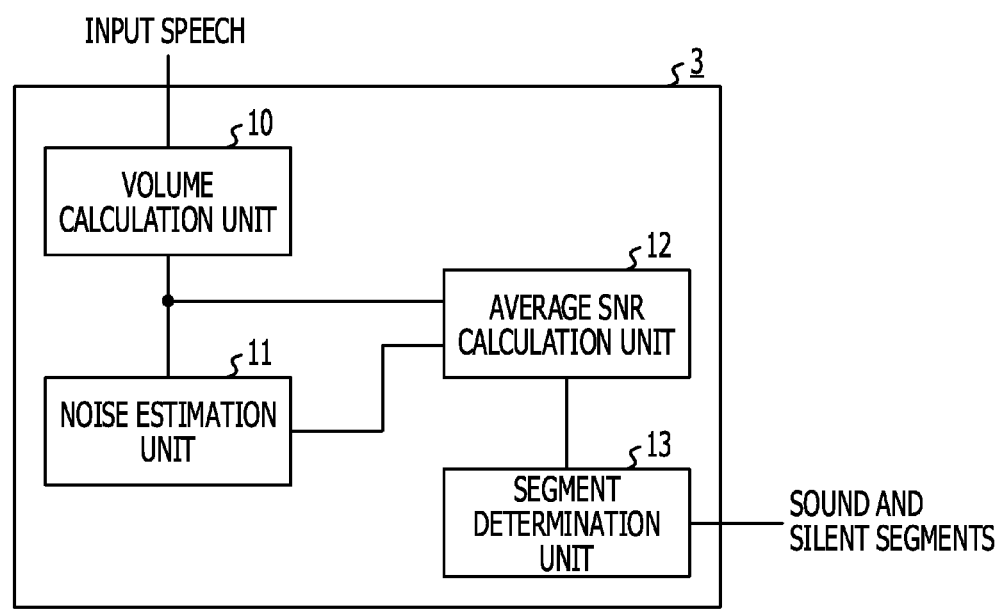
FIG. 2 is a functional block diagram of a detection unit according to an embodiment.

Detection of sound and silent segments by the detection unit 3 is now described in detail. FIG. 2 is a functional block diagram of the detection unit 3 according to an embodiment. The detection unit 3 includes a volume calculation unit 10, a noise estimation unit 11, an average SNR calculation unit 12, and a segment determination unit 13. The detection unit 3 does not have to have the volume calculation unit 10, noise estimation unit 11, average SNR calculation unit 12, and segment determination unit 13, but the functions of the components may be realized in a hardware circuit composed of one or multiple wired logics. Instead of a hardware circuit based on wired logics, the functions of the components of the detection unit 3 may be implemented in functional modules realized by computer programs executed in the speech processing device 1.

In FIG. 2, input speech is input to the volume calculation unit 10 via the detection unit 3. The volume calculation unit 10 has a buffer or cache not illustrated having a length of m. The volume calculation unit 10 calculates the sound volume of each of frames included in the input speech, and outputs the sound volume to the noise estimation unit 11 and the average SNR calculation unit 12. The length of a frame included in input speech is 0.2 msec, for example. The sound volume S of a frame may be calculated according to:

$$S(f) = \sum_{t=f*M}^{(f+1)*M-1} c(t)^2 \qquad (1)$$

where f represents a frame number consecutively assigned to frames from the start of input of sound frames included in input speech (where f is an integer≥0); M represents the time length of a frame; t represents time; and c(t) represents the amplitude (power) of the input speech.

The noise estimation unit 11 receives the sound volume S(f) of each frame from the volume calculation unit 10. The noise estimation unit 11 estimates noise in the frame and outputs the result of noise estimation to the average SNR calculation unit 12. For estimation of noise in frames, the noise estimation unit 11 may employ the noise estimation method 1 or 2 described below, for example.

(Noise Estimation Method 1)

The noise estimation unit 11 may estimate the magnitude (power) N(f) of noise in frame f according to the expression below based on the sound volume S(f) of frame f, the sound volume S(f−1) of the immediately preceding frame (f−1), and its magnitude of noise N(f−1):

$$N(f) = \begin{cases} \alpha \cdot N(f-1) + (1-\alpha) \cdot S(f), & (\text{if } |S(f-1) - S(f)| < \beta) \\ N(f-1), & (\text{otherwise}) \end{cases} \qquad (2)$$

Here, α and β are constants, which may be experimentally determined. For example, α=0.9 and β=2.0. The initial value of noise power, N(−1), may also be experimentally determined. In the expression 2, if the sound volume S(f) of frame f does not vary from the sound volume S(f−1) of the preceding frame f−1 by a fixed value β or greater, the noise power N(f) of frame f is updated. If the sound volume S(f) of frame f varies from the sound volume S(f−1) of the preceding frame f−1 by the fixed value β or greater, the noise power N(f−1) of the preceding frame f−1 is set as the noise power N(f) of frame f. Noise power N(f) may be called the result of noise estimation mentioned above.

(Noise Estimation Method 2)

The noise estimation unit 11 may use the expression 3 given below to update the noise magnitude according to the ratio between the sound volume S(f) of frame f and the noise power N(f−1) of the preceding frame f−1:

$$N(f) = \begin{cases} \alpha \cdot N(f-1) + (1-\alpha) \cdot S(f), & (\text{if } S(f) < \gamma \cdot N(f-1)) \\ N(f-1), & (\text{otherwise}) \end{cases} \qquad (3)$$

where γ is a constant, which may be experimentally determined. For example, γ=2.0. The initial value N(−1) of noise power may also be experimentally determined. When the sound volume S(f) of frame f is smaller than the noise power N(f−1) of the preceding frame f−1 multiplied by a fixed value γ in the expression 3, the noise power N(f) of frame f is updated. When the sound volume S(f) of frame f is equal to or greater than the noise power N(f−1) of the preceding frame f−1 multiplied by γ in the expression 3, noise power N(f−1) of the preceding frame f−1 is set as the noise power N(f) of frame f.

In FIG. 2, the average SNR calculation unit 12 receives the sound volume S(f) of each frame from the volume calculation unit 10 and receives the noise power N(f) of each frame as the result of noise estimation from the noise estimation unit 11. The average SNR calculation unit 12 has a cache or memory not illustrated, in which sound volume S(f) and noise power N(f) for L past frames are stored. The average SNR calculation unit 12 uses the expression below to calculate the average SNR for an analysis target time period (or frames) and outputs the average SNR to the segment determination unit 13:

$$SNR(f) = \frac{1}{L} \sum_{i=0}^{L-1} \frac{S(f-i)}{N(f-i)} \qquad (4)$$

where L may be defined as a value greater than a typical length of a sokuon; it may be set to a number of frames equivalent to 0.5 msec, for example.

The segment determination unit 13 receives the average SNR from the average SNR calculation unit 12. The segment determination unit 13 has a buffer or cache not illustrated, in which a flag f_breath indicating whether the most recent frame processed by the segment determination unit 13 falls in a sound segment (or in an exhalation segment) or not is stored. Based on the average SNR and f_breath, the segment determination unit 13 detects the start tb of a sound segment using the expression 5 below and the end to of the sound segment using the expression 6:

$$tb = f \times M$$

(if f_breath=not a sound segment and if SNR(f) >TH$_{SNR}$)  (5)

$$te = f \times M - 1$$

(if f_breath=a sound segment and if SNR(f)<TH$_{SNR}$)  (6)

where TH$_{SNR}$ is a threshold by which to decide that frame f processed by the segment determination unit 13 is not noise (the threshold may be called a first threshold), and may be experimentally determined. The segment determination unit 13 is also able to detect segments except the sound segment in the input speech as silent segments.

Figure 3:
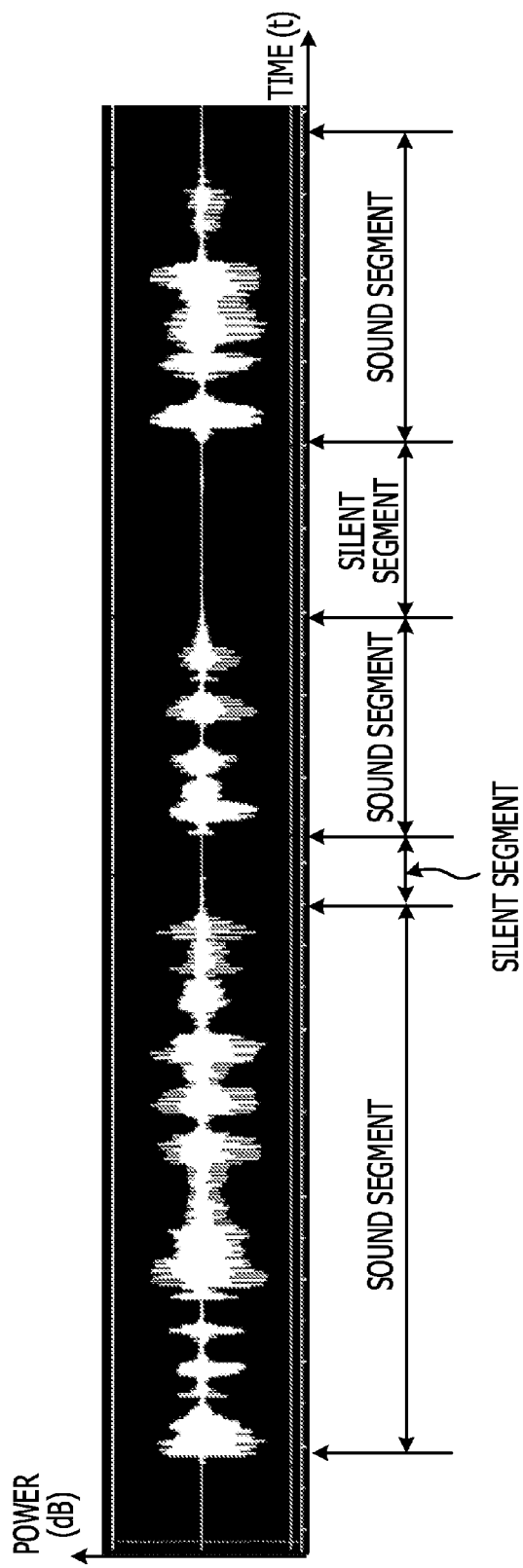
FIG. 3 illustrates results of sound and silent segment detection by the detection unit.

FIG. 3 illustrates a result of sound and silent segment detection by the detection unit 3. In FIG. 3, the horizontal axis represents time and the vertical axis represents the sound volume (amplitude) of the input speech. As illustrated in FIG. 3, a segment that follows the end of a sound segment is detected as a silent segment. Also as illustrated in FIG. 3, in detection of sound segments by the detection unit 3 disclosed in the first embodiment, noise is learned in association with background noise and sound segments are identified based on SNR. This may avoid false detection of sound segments due to background noise. In addition, determining the average SNR from multiple frames provides the advantage of being able to extract even a sound segment that contains instantaneous silence as a continuous sound segment. The detection unit 3 may employ the method described in International Publication Pamphlet No. WO 2009/145192. The detection unit 3 does not have to detect sound and silent segments, but detection of both sound and silent segments and execution of the processes described below only on sound segments may significantly reduce processing load. For the purpose of description, the first embodiment assumes that the detection unit 3 detects both sound and silent segments.

The detection unit 3 detects a vowel segment in a sound segment according to formant distribution of the input speech, for example. For detecting a vowel segment, the detection unit 3 may employ the method described in Japanese Laid-open Patent Publication No. 2009-258366, for instance. Using the method, the detection unit 3 may also detect vowel segment length, which is the duration of the vowel segment. The detection unit 3 outputs the detected vowel segment to the vowel segment length calculation unit 5 and the control unit 6.

In FIG. 1, the accent segment estimation unit 4 is a hardware circuit composed of wired logic, for example. The accent segment estimation unit 4 may also be a functional module realized by a computer program executed in the speech processing device 1. The accent segment estimation unit 4 receives the input speech from the acquisition unit 2 and vowel segments from the detection unit 3. The accent segment estimation unit 4 estimates an accent segment included in the input speech. Specifically, the accent segment estimation unit 4 estimates the accent segment based on the amount of change in the pitch frequency or power of the input speech per unit time, for example. Accent segment estimation performed by the accent segment estimation unit 4 is now described in detail.

(Accent Segment Estimation Method 1)

The accent segment estimation unit 4 calculates the pitch frequency of each frame in the input speech. The accent segment estimation unit 4 may employ the autocorrelation of speech waveforms of input speech disclosed in Japanese Laid-open Patent Publication No. 63-155200 to calculate the pitch frequency, for instance. The accent segment estimation unit 4 next calculates pitch variation rate, ratio, indicating the average pitch variation of each frame (per unit time), according to:

$$\text{ratio} = \underset{i=n}{\overset{n+L}{\text{ave}}}(\text{Pit}(i) - \text{Pit}(i-1)) \tag{7}$$

where Pit(n) represents the pitch frequency (Hz) of frame n, and L is the number of frames averaged (10 frames (equivalent to 200 ms), for example). The accent segment estimation unit 4 then estimates that a segment having a strong trend of decrease in pitch variation rate (a segment in which a certain threshold is not satisfied) is an accent segment.

Figure 4A:
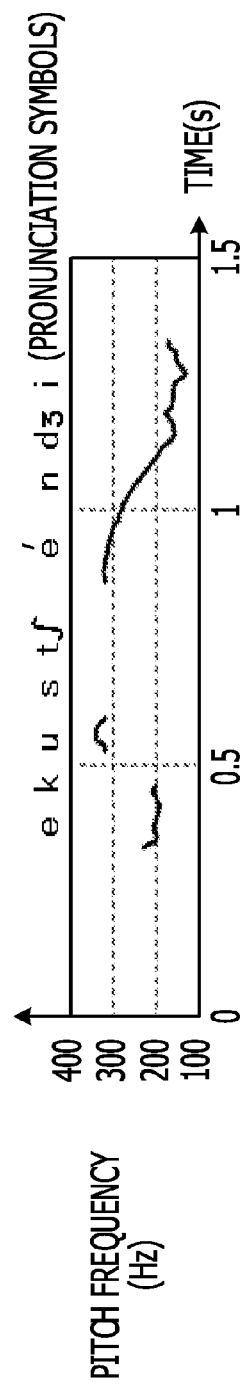
Figure 4B:
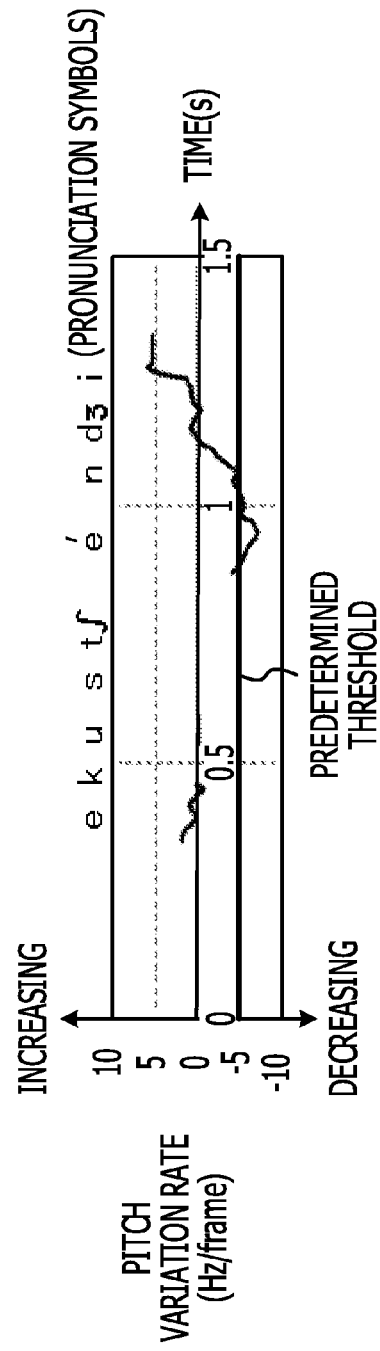
FIG. 4B illustrates the relationship between a sound segment and pitch variation rate.

FIG. 4A illustrates the relationship between a sound segment and pitch frequency, while FIG. 4B illustrates the relationship between a sound segment and pitch variation rate. In FIGS. 4A and 4B, the sound segment is composed of the word "exchange". The pitch variation rate represented in FIG. 4B is calculated based on the pitch frequency of FIG. 4A and the expression 7 above. In FIG. 4B, a threshold that is satisfied by a segment having a strong trend of decrease in pitch variation rate is −5 (Hz/frame), for example. As is seen from FIG. 4B, it was found out through study by the present inventors that a segment having a strong trend of decrease in pitch variation rate agrees with the actual accent segment. This implies that the accent segment estimation unit 4 is able to estimate the accent segment based on the amount of change in the pitch frequency of input speech per unit time.

(Accent Segment Estimation Method 2)

The accent segment estimation unit 4 calculates the power of each frame of the input speech. Next, the accent segment estimation unit 4 calculates power variation rate, ratio(n), indicating the average value of power variation for each frame (per unit time), according to:

$$\text{ratio}(n) = \underset{i=n}{\overset{n+L}{\text{ave}}}(\text{Pow}(i) - \text{Pow}(i-1)) \tag{8}$$

where Pow(n) is the power of frame n (unit: dB) and L is the number of frames averaged (25 frames (equivalent to 500 ms) for example). The accent segment estimation unit 4 then estimates that a segment having a strong trend of decrease in power variation rate (a segment in which a certain threshold is not satisfied) is the accent segment.

FIG. 5A illustrates the relationship between a sound segment and power, while FIG. 5B illustrates the relationship between a sound segment and power variation rate. In FIGS. 5A and 5B, the sound segment is composed of the word "exchange". The power variation rate illustrated in FIG. 5B is calculated from the power illustrated in FIG. 5A and the expression 8 above, for example. In FIG. 5B, a threshold that is satisfied by a segment having a strong trend of decrease in power variation rate is −2 (dB/frame), for example. As is seen from FIG. 5B, it was found out through study by the present inventors that a segment having a strong trend of decrease in power variation rate agreed with the actual accent segment. This implies that the accent segment estimation unit 4 is able to estimate the accent segment based on the amount of change in the power of input speech per unit time.

The vowel segment length calculation unit 5 calculates (in other words, the vowel segment length calculation unit 5 specifies) a first vowel segment length and a second vowel segment length from the accent segment estimated by the accent segment estimation unit 4 and the vowel segment received from the detection unit 3. Specifically, the vowel segment length calculation unit 5 defines the length of a vowel segment containing the accent segment as the first vowel segment length and defines the length of a vowel segment not containing the accent segment as the second vowel segment length. The vowel segment length calculation unit 5 outputs the first vowel segment length and the second vowel segment length to the control unit 6.

The control unit 6 of FIG. 1 is a hardware circuit composed of wired logic, for example. The control unit 6 may also be a functional module realized by a computer program executed in the speech processing device 1. The control unit 6 receives the vowel segment from the detection unit 3 and receives the first and second vowel segment lengths from the vowel segment length calculation unit 5. The control unit 6 also receives the input speech from the acquisition unit 2. The control unit 6 implements control to extend the first vowel segment length or shorten the second vowel segment length. The control unit 6 also controls the first vowel segment length or the second vowel segment length based on the ratio or difference between the first vowel segment length and the second vowel segment length. The control unit 6 also implements control to extend or shorten the first vowel segment length or the second vowel segment length so that the first vowel segment length becomes longer than the second vowel segment length. Control on the first vowel segment length and the second vowel segment length by the control unit 6 is described below in greater detail.

The control unit 6 calculates a vowel segment length ratio, rate, indicating the ratio of the first vowel segment length and the second vowel segment length, according to:

$$\text{rate} = \frac{L_e}{L_s} \tag{9}$$

where Ls represents the first vowel segment length and Le represents the second vowel segment length. The control unit 6 controls the first vowel segment length or the second vowel segment length according to the vowel segment length ratio and a predetermined target scaling factor (which may be called the amount of control). The control unit 6 may carry out control to extend/shorten one or both of the first vowel segment length and the second vowel segment length so that the first vowel segment length becomes longer than the second vowel segment length. For the purpose of description, the first embodiment describes a method to control the second vowel segment length.

Figure 6:
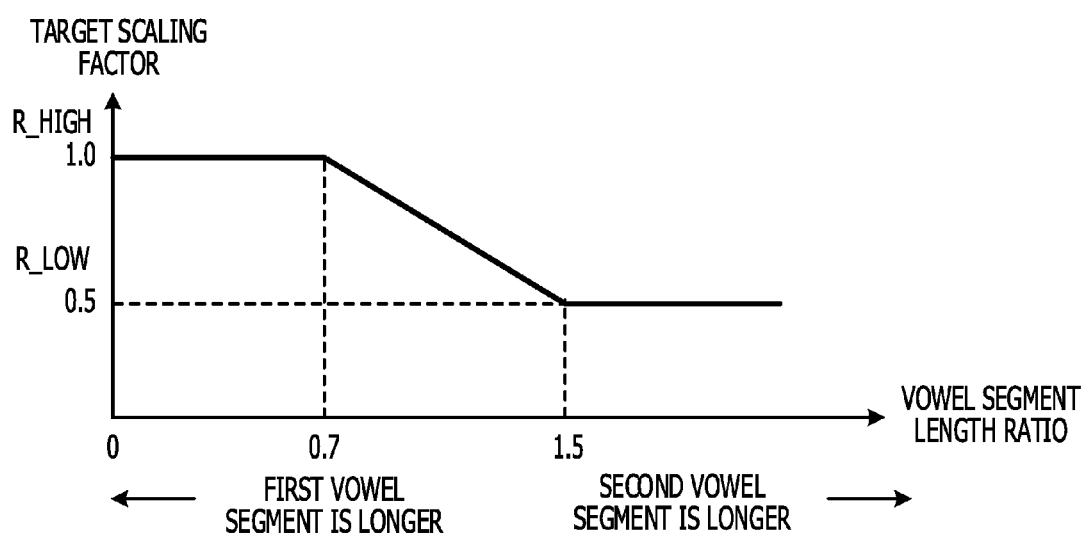
FIG. 6 illustrates the relationship between the vowel segment length ratio and the target scaling factor.

FIG. 6 illustrates the relationship between vowel segment length ratio and target scaling factor. In FIG. 6, r_high indicates an upper bound on the target scaling factor and r_low indicates a lower bound on the target scaling factor. The target scaling factor is a value to be multiplied to the second vowel segment length and may have the upper bound of 1.0 and the lower bound of 0.5, for example. By setting the lower bound at around 0.5, degradation in sound quality resulting from excessive waveform extension/shortening may be avoided. The target scaling factor may also be established using the difference between the first vowel segment length and the second vowel segment length. In the relationship illustrated in FIG. 6, for a segment for which the target scaling factor is greater than r_low and smaller than r_high, a curve of second order or sigmoid curve that varies with curvatures around r_low and r_high may be defined instead of a straight line.

The control unit 6 implements control so that certain samples are deleted in the segment represented by the second vowel segment length and that the actual scaling factor (rate_result(n)) represented by the expression below becomes equal to the target scaling factor (rate_target(n)) described above or greater:

$$\text{rate\_result}(n) = \frac{(n-s) \times M - \sum_{i=s}^{n} \text{diff}(i)}{(n-s) \times M} \tag{10}$$

where s represents the start frame of the segment of the vowel segment length or the second vowel segment length, and n represents the current frame (n>s). In addition, diff(i) represents the number of samples increased or decreased in the ith frame, and M represents the number of samples per frame (80 samples for example). In expression 10, the denominator represents the total number of samples in past frames before extension/shortening and the numerator represents the total number of samples in the past frames after extension/shortening.

The control unit 6 outputs a control signal having the second vowel segment length included in the input speech controlled to the outside as output speech. The control unit 6 may output the output speech to a speaker not illustrated which is connected with or located in the speech processing device 1, for example.

Here, the technical meaning of implementing control to extend or shorten the first or second vowel segment length so that the first vowel segment length becomes longer than the second vowel segment length based on the ratio or difference between the first vowel segment length and the second vowel segment length in the first embodiment will be described. The present inventors newly took note of the fact that input speech is better understood by a native speaker by controlling the utterance condition of a non-native user speaking a foreign language so that it becomes close to the utterance condition of a native speaker of the language. The inventors accordingly studied the difference in utterance condition between a native speaker and a non-native speaker.

FIG. 7A illustrates the relationship between a sound segment and the power spectrum of frequency bands for a native speaker's utterance. FIG. 7B illustrates the relationship between a sound segment and the power spectrum of frequency bands for a non-native speaker's utterance. In FIGS. 7A and 7B, the sound segment is composed of the word "exchange". As illustrated in FIG. 7A, it was confirmed that in the native speaker's utterance, the first vowel segment length including the accent segment is longer than the second vowel segment length. In contrast, in the non-native speaker's utterance, the first vowel segment length is approximately the same as the second vowel segment length as illustrated in FIG. 7B. It was also found out that unnecessary vowels were uttered outside the accent segment (that is, in the second vowel segment). This is probably because one Japanese letter consists of a combination of a consonant and a vowel and this characteristic affects pronunciation of English words by a native speaker of Japanese, for example. Thus, control to extend or shorten the first or second vowel segment length so that the first vowel segment length becomes longer than the second vowel segment length may make the input speech easier to understand.

Figure 8:
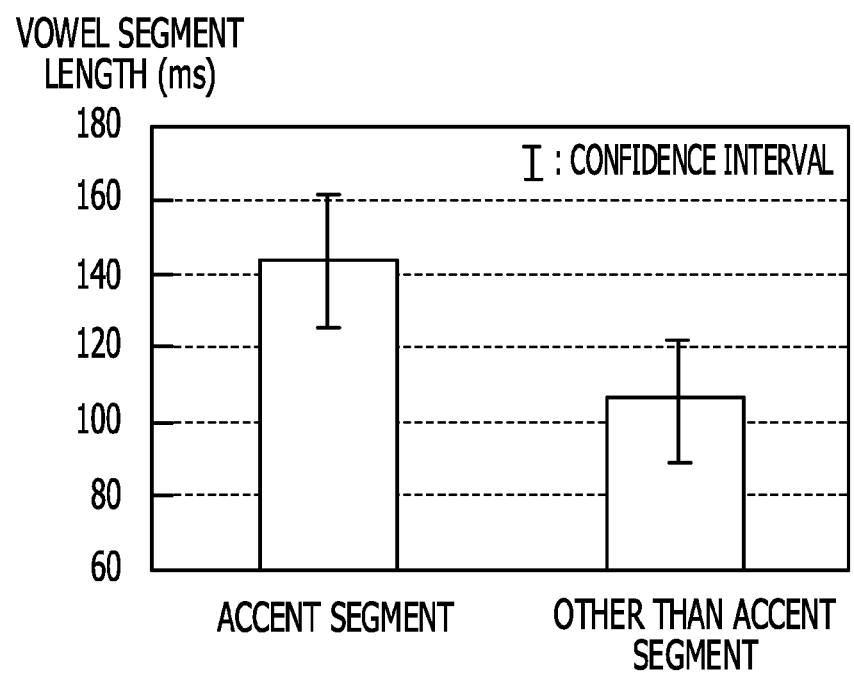
FIG. 8 illustrates the relationship between the first vowel segment length and the second vowel segment length for words spoken by native speakers.

FIG. 8 illustrates the relationship between the first vowel segment length and the second vowel segment length for words pronounced by native speakers. FIG. 8 illustrates comparison between the first vowel segment length and the second vowel segment length for a case where three male and three female native speakers uttered 17 different words. It was proved that the first vowel segment length was longer than the second vowel segment length as indicated by FIG. 8. Thus, control to extend or shorten the first or second vowel segment length so that the first vowel segment length becomes longer than the second vowel segment length may make the input speech easier to understand. In addition, since speech processing has to be performed only on vowel segments and not on consonant segments, this method has the advantage of small processing load in speech processing.

Figure 9:
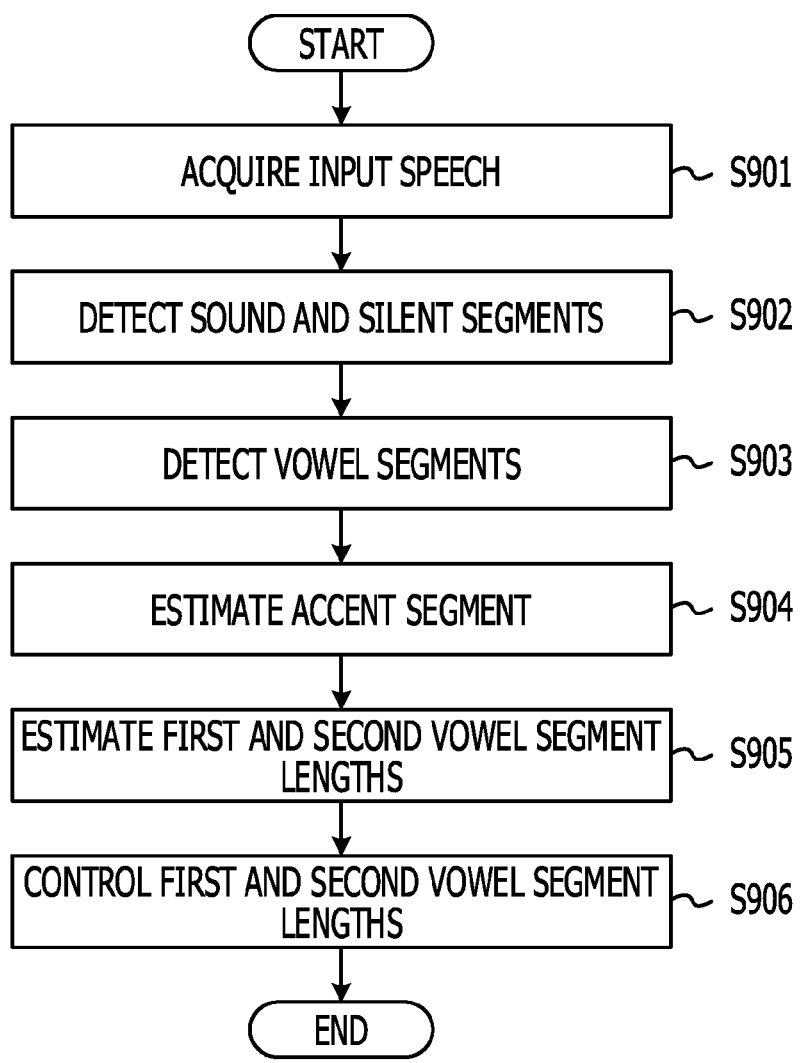
FIG. 9 is a flowchart illustrating a speech processing method to be carried out by the speech processing device.

FIG. 9 is a flowchart illustrating a speech processing method performed by the speech processing device 1. The acquisition unit 2 acquires input speech via a wired or wireless circuit, for example (step S901). The acquisition unit 2 outputs the input speech to the detection unit 3, the accent segment estimation unit 4 and the control unit 6. The detection unit 3 receives the input speech from the acquisition unit 2. The detection unit 3 detects sound segments and silent segments contained in the input speech (step S902). The detection unit 3 does not have to detect sound segments and silent segments at step S902, but detection of both sound and silent segments and execution of the processes described below only on sound segments may significantly reduce processing load.

The detection unit 3 detects a vowel segment in a sound segment according to, for example, formant distribution of the input speech (step S903). For detecting a vowel segment, the detection unit 3 may employ the method described in Japanese Laid-open Patent Publication No. 2009-258366, for instance. Using the method, the detection unit 3 may also detect vowel segment length, which is the duration of the vowel segment. The detection unit 3 outputs the detected vowel segment to the vowel segment length calculation unit 5 and the control unit 6.

The accent segment estimation unit 4 receives the input speech from the acquisition unit 2 and vowel segments from the detection unit 3. The accent segment estimation unit 4 estimates the first vowel segment length included in the accent segment contained in the input speech or the second vowel segment length excluding the accent segment. Specifically, the accent segment estimation unit 4 estimates the accent segment based on the amount of change in the pitch frequency or power of the input speech per unit time using the above-described methods, for example (step S904).

The vowel segment length calculation unit 5 estimates the first vowel segment length and the second vowel segment length from the accent segment estimated by the accent segment estimation unit 4 and the vowel segment received from the detection unit 3 (step S905). Specifically, the vowel segment length calculation unit 5 defines the length of the vowel segment containing the accent segment as the first vowel segment length and defines the length of a vowel segment not containing the accent segment as the second vowel segment length. The vowel segment length calculation unit 5 outputs the first vowel segment length and the second vowel segment length to the control unit 6.

The control unit 6 receives the vowel segment from the detection unit 3 and receives the first and second vowel segment lengths from the vowel segment length calculation unit 5. The control unit 6 also receives the input speech from the acquisition unit 2. The control unit 6 implements control to extend the first vowel segment length or shorten the second vowel segment length (step S906). The control unit 6 also controls the first vowel segment length or the second vowel segment length based on the ratio or difference between the first vowel segment length and the second vowel segment length at step S906. The control unit 6 also implements control to extend or shorten the first vowel segment length or the second vowel segment length so that the first vowel segment length becomes longer than the second vowel segment length at step S906. If the acquisition unit 2 has acquired input speech when the process at step S906 is completed, the speech processing device 1 repeats the process from step S901 to S906. If the acquisition unit 2 has not acquired input speech when the process at step S906 is completed, the speech processing device 1 ends the speech processing illustrated in the flowchart of FIG. 9.

The speech processing device according to the first embodiment enables a user's input speech to be better understood with reduced processing load in speech processing. It does not involve generation of synthesized voice as in related arts and also may maintain the uniqueness of the user's utterance condition. Maintaining the uniqueness is also advantageous in that the speaker may be easily identified during a telephone conversation thorough a telephone application, for example.

Second Embodiment

The first embodiment described a speech processing device, speech processing method, and speech processing program in which the control unit 6 controls the first vowel segment length or the second vowel segment length based on the ratio or difference between the first vowel segment length and the second vowel segment length. A second embodiment will describe a speech processing device, speech processing method, and speech processing program in which the first vowel segment length and the second vowel segment length are controlled according to vowel segment length. As the functional blocks of the speech processing device 1 in the second embodiment are the same as FIG. 1, only differences from the first embodiment will be described.

Figure 10:
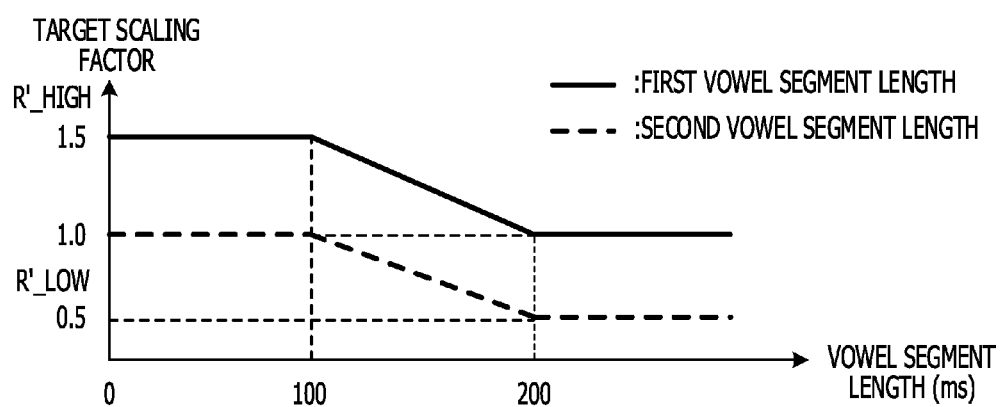
FIG. 10 illustrates the relationship between vowel segment length and the target scaling factor.

The control unit 6 implements control to extend the first vowel segment length or shorten the second vowel segment length. FIG. 10 illustrates the relationship between vowel segment length and target scaling factor, where r'_high indicates the upper bound on the target scaling factor and r'_low indicates the lower bound on the target scaling factor. The target scaling factor is a value to be multiplied to the first vowel segment length or the second vowel segment length and may have the upper bound of 1.5 and the lower bound of 0.5, for example. By setting the upper bound at around 1.5 and the lower bound at around 0.5, degradation in sound quality resulting from excessive waveform extension/shortening may be avoided. The control unit 6 implements control so that samples are appropriately increased or decreased in first vowel segment or the second vowel segment and the actual scaling factor (rate_result(n)) represented by the expression 10 above is equal to or greater than the target scaling factor (rate_target(n)).

The speech processing device according to the second embodiment enables a user's input speech to be better understood with reduced processing load in speech processing.

Third Embodiment

Figure 11:
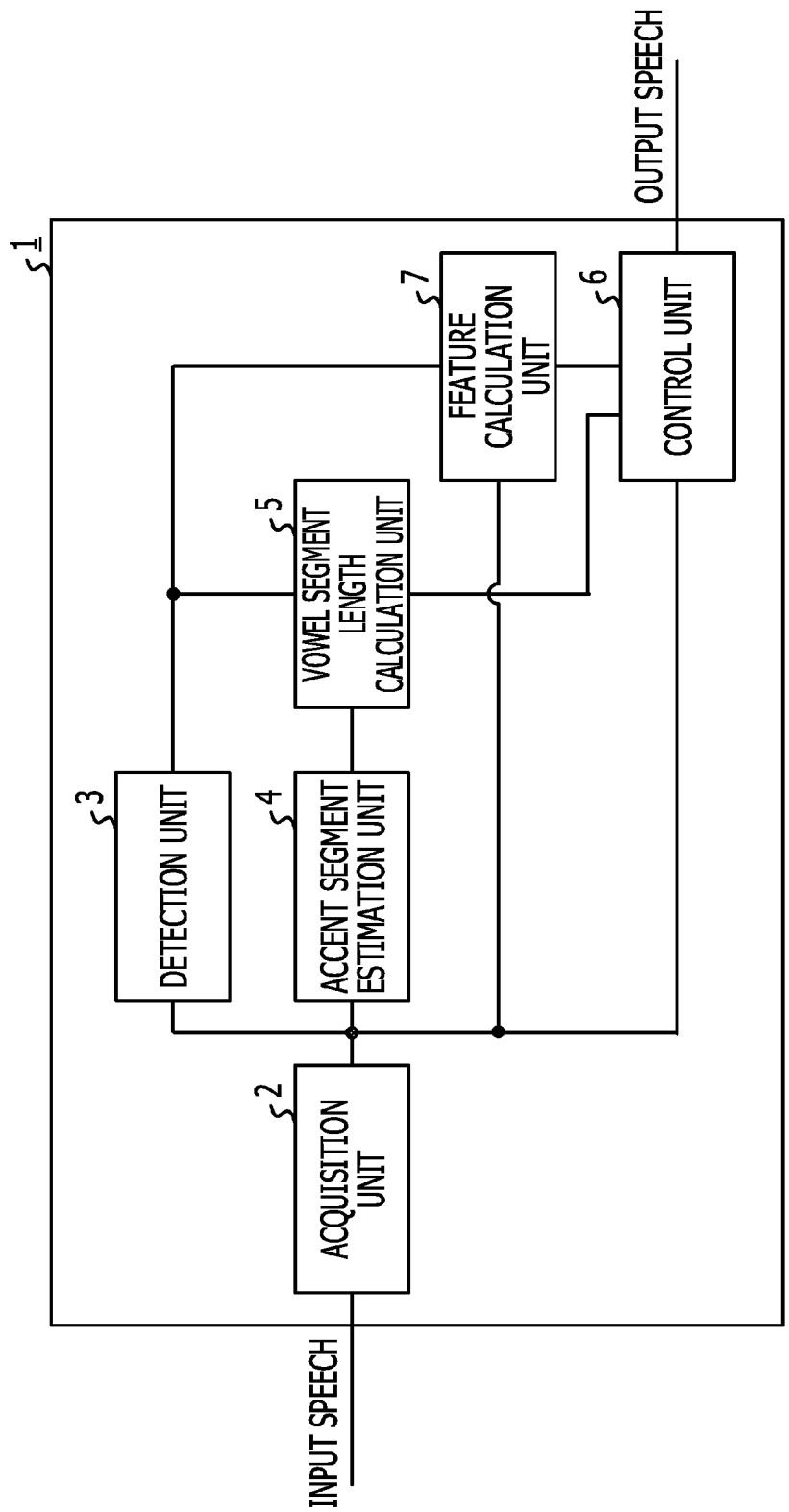
FIG. 11 is a functional block diagram of the speech processing device according to a third embodiment.

FIG. 11 is a functional block diagram of the speech processing device 1 according to a third embodiment. The speech processing device 1 includes an acquisition unit 2, a detection unit 3, an accent segment estimation unit 4, a vowel segment length calculation unit 5, a control unit 6, and a feature calculation unit 7. As the acquisition unit 2, detection unit 3, accent segment estimation unit 4, vowel segment length calculation unit 5, and control unit 6 have similar functions to the first embodiment, detailed descriptions on them are omitted.

The feature calculation unit 7 is a hardware circuit composed of wired logic, for example. The feature calculation unit 7 may also be a functional module realized by a computer program executed in the speech processing device 1. The feature calculation unit 7 receives input speech from the acquisition unit 2 and receives the first vowel segment length and the second vowel segment length from the vowel segment length calculation unit 5. The feature calculation unit 7 calculates the fundamental period of the first vowel segment length or the second vowel segment length. The feature calculation unit 7 also calculates the amount of acoustic feature of the first vowel segment length or the second vowel segment length. The amount of acoustic feature is at least one of pitch frequency, formant frequency, and autocorrelation, for example. Calculation performed by the feature calculation unit 7 and control by the control unit 6 in the third embodiment will be described in more detail below.

The feature calculation unit 7 uses autocorrelation to calculate the fundamental period, which will be the interval at which speech waveforms are thinned out (or repeated) when the first vowel segment length or the second vowel segment length is extended or shortened. Autocorrelation is a measure indicating how well the input signal (input speech) matches a signal generated by shifting the input signal itself in time. By determining the period at which the autocorrelation coefficient of a sampled input signal is the maximum, the fundamental period of the segment represented by the first vowel segment length or the second vowel segment length may be computed. Autocorrelation R(t) may be calculated using:

$$R(\tau) = \frac{\sum_{i=1}^{L} x(i) \cdot x(i+\tau)}{\sqrt{\sum_{i=1}^{L} x^2(i)} \sqrt{\sum_{i=1}^{L} x^2(i+\tau)}} \quad (11)$$

where x(n) represents the signal in which input speech was sampled, L represents the length for which to calculate autocorrelation (100 samples for example), and τ represents the number of samples for time shift.

Next, the feature calculation unit 7 calculates fundamental period fp(n) from autocorrelation R(t) according to:

$$fp(n)=\tau|R(\tau)=\max\{R(i)|i>0\} \quad (12)$$

where n represents frame number.

The feature calculation unit 7 calculates a pitch variation rate indicating the temporal variation of the pitch frequency based on the fundamental period calculated using the expression 12. The feature calculation unit 7 first calculates pitch frequency Pit(n) from fundamental period fp(n) according to:

$$\text{Pit}(n)=Fs/fp(n) \quad (13)$$

where Fs represents the sampling frequency (8000 Hz for example). Then, pitch variation rate, ratio(n), indicating the temporal variation of the pitch frequency is calculated according to:

$$\text{ratio}(n) = \underset{i=n-L/2}{\overset{n+L/2}{\text{ave}}} (\text{Pit}(i) - \text{Pit}(i-1)) \quad (14)$$

where L represents the number of frames averaged (four frames, for example, which is equivalent to 80 ms). The feature calculation unit 7 outputs the calculated fundamental period and pitch variation rate to the control unit 6.

Here, the feature calculation unit 7 may calculate formant variation rate instead of pitch variation rate. The formant frequency of input speech may be appropriately calculated using linear prediction coding (LPC) analysis or the method disclosed in Japanese Laid-open Patent Publication No. 62-54297, for example. The feature calculation unit 7 may calculate formant variation rate, ratio(n), according to:

$$\text{ratio}(n) = \underset{i=n-L/2}{\overset{n+L/2}{\text{ave}}} (F(i, j) - F(i-1, j)) \quad (15)$$

where L represents the number of frames averaged (four frames, for example, which is equivalent to 80 ms), and F(n, j) represents the jth formant frequency (Hz) in frame n.

The feature calculation unit 7 outputs the fundamental period and formant variation rate to the control unit 6. While the first embodiment describes that the fundamental period and pitch variation rate are output to the control unit 6 for the sake of description, detailed description about formant variation rate is omitted because the process described below may be carried out using formant variation rate similarly to where pitch variation rate is employed.

Further, the feature calculation unit 7 may calculate the temporal variation rate of autocorrelation instead of pitch variation rate or formant variation rate. Autocorrelation is a measure indicating how well the input speech matches a signal generated by shifting the input speech itself in time; a large autocorrelation value indicates small variation in the periodic waveform of the input speech. Thus, by repeating or thinning out periodic waveforms in a segment for which the autocorrelation value is equal to or greater than a predetermined threshold TH_ac (0.7 for example), distortion associated with insertion or deletion of waveforms may be reduced, enabling control of the first vowel segment length or the second vowel segment length without causing degradation in sound quality. For example, as described later, when the temporal variation rate ac(n) of autocorrelation is equal to or greater than TH_ac, the control unit 6 decides that it is a segment with small variations in periodic waveform and shortens the first vowel segment length or the second vowel segment length. When the temporal variation rate ac(n) of autocorrelation is smaller than TH_ac, the control unit 6 decides that it is a segment with large variations in periodic waveform and does not shorten the first vowel segment length or the second vowel segment length. The feature calculation unit 7 calculates the temporal variation rate ac(n) of autocorrelation of the input speech according to:

$$ac(n) = \max_{\tau=1}^{Smax} \left\{ \frac{\sum_{i=0}^{i=M-1} x(n-i)x(n-\tau-i)}{\sqrt{\sum_{i=0}^{i=M-1} x^2(n-i)} \sqrt{\sum_{i=0}^{i=M-1} x^2(n-\tau-i)}} \right\} \quad (16)$$

where x(n) represents input signal, M represents the length of correlation calculation range (400 samples for example) and Smax represents the maximum amount of shift (160 samples for example).

The feature calculation unit 7 outputs the fundamental period and the temporal variation rate of autocorrelation to the control unit 6. While the first embodiment describes that the fundamental period and pitch variation rate are output to the control unit 6 for the sake of illustration, detailed description about the temporal variation rate of autocorrelation is omitted because the process described below may be carried out using temporal variation rate of autocorrelation similarly to where pitch variation rate is employed.

The control unit 6 receives the first vowel segment length and the second vowel segment length from the vowel segment length calculation unit 5. The control unit 6 also receives input speech from the acquisition unit 2 and the fundamental period and pitch variation rate from the feature calculation unit 7. The control unit 6 controls the first vowel segment length or the second vowel segment length in units of the length of the fundamental period. The control unit 6 also controls the first vowel segment length or the second vowel segment length in a segment for which the variation of amount of acoustic feature including pitch variation rate per unit time is below a predetermined first threshold.

For extending or shortening the vowel segment length in a segment with small sound quality variations, the control unit 6 generates a control signal CS(n) according to the conditional expressions given below so that shortening (or extension) of speech waveforms is implemented only in a segment for which the pitch variation rate is below a certain threshold TH_pit (which may be called the first threshold and the value of TH_pit may be 5.0 (Hz/frame) for example).

If ratio(n)<TH_pit, then CS(n)=1: then implement extension/shortening (where pitch variation is small),
If ratio(n)≤TH_pit, then CS(n)=0: not implement extension/shortening (where pitch variation is large).

The control unit 6 uses the expression 9 above to calculate the vowel segment length ratio and, based on the vowel segment length ratio and the target scaling factor of FIG. 6, increases or decreases the number of samples in the first vowel segment or the second vowel segment for a segment having small temporal variations of the pitch frequency, for example. Since the number of samples to be decreased (or increased) by the control unit 6 depends on the fundamental period, it varies from frame to frame. It is thus desired to control so that the scaling factor of the entire first vowel segment or second vowel segment approaches the aforementioned target scaling factor. The control unit 6 accordingly calculates the actual scaling factor for past frames of the vowel segment using the expression 10 above, and implements control to extend or shorten waveforms if the difference between the actual scaling factor (rate_result(n)) and the target scaling factor (rate_target(n)) is large.

The control unit 6 generates control signal CS(n) according to the conditional expressions given below, for example, so that shortening (or extension) of speech waveforms is implemented when the difference between the actual scaling factor and the target scaling factor is below a predetermined threshold TH_diff (0.1 for example).

If |rate_result(n)−rate_target(n)|<TH_diff, then CS(n)=1: implement extension/shortening;
Otherwise, CS(n)=0: not implement extension/shortening.

The control unit 6 controls a vowel segment length by deleting (or inserting) speech waveforms in the first vowel segment or the second vowel segment according to the control signal and the fundamental period. Processing for shortening the vowel segment length (when target scaling factor<1) is described first. If one period of speech waveform is simply deleted in a speech waveform having a smoothly varying pitch, discontinuous distortions might occur before and after the deleted waveform and cause degradation in sound quality. The control unit 6 accordingly implements control so that the waveforms preceding and following the periodic waveform to be deleted is also modified to make the pitch smoothly vary. In other words, the control unit 6 makes the latter part of the periodic waveform preceding the target periodic waveform to be deleted resemble the latter part of the target periodic waveform and makes the periodic waveform following the target periodic waveform close to the former part of the target periodic waveform. Put differently, the control unit 6 extends or shortens the first vowel segment length or the second vowel segment length by adding a signal in which a weighting factor that decreases over time is applied to the frame preceding the target frame to be controlled, and a signal in which a weighting factor that increases over time is applied to the frame following the target frame. This may reduce degradation in sound quality resulting from waveform deletion. Specific processing performed by the control unit 6 may be realized by weighted addition on the input speech as expressed by:

$$y(t) = w_1(t) \times (t) + w_2(t) \times (t+L) \quad (17)$$

where L is the fundamental period, and $w_1(t)$ and $w_2(t)$ represent weight functions expressed by:

$$w_1(t) = \begin{cases} 1 & t \leq t_1 - N/2 \\ \cos\left(\frac{t-(t_1-N/2)}{N} \cdot \frac{\pi}{2}\right) & t_1 - N/2 < t \leq t_1 + N/2 \\ 0 & t > t_1 + N/2 \end{cases} \quad (18)$$

$$w_2(t) = \begin{cases} 0 & t \leq t_1 - N/2 \\ 1 - \cos\left(\frac{t-(t_1-N/2)}{N} \cdot \frac{\pi}{2}\right) & t_1 - N/2 < t \leq t_1 + N/2 \\ 1 & t > t_1 + N/2 \end{cases}$$

where $t_1$ is the number of samples present where waveform is deleted, and N is the number of samples in the segment to be weighted, which may be the number of first samples in the nth frame, for example.

If the control unit 6 deletes multiple fundamental periods together, distortion in the waveforms preceding and following the deleted fundamental periods would be large and possibly result in degradation in sound quality. To avoid this, the control unit 6 may set a flag indicating whether each fundamental period has been deleted or not in a buffer or memory not illustrated provided in the control unit 6. By the control unit 6 referencing the buffer and controlling processing so that the fundamental period immediately following a deleted fundamental period is not deleted, degradation of sound quality may be reduced. Through such a process, the control unit 6 is able to shorten the first vowel segment length or the second vowel segment length.

Next, processing for extending the vowel segment length (when target scaling factor≥1) is described. If one period of speech waveform is simply inserted in a speech waveform having a smoothly varying pitch, discontinuous distortions might occur before and after the inserted waveform and cause degradation in sound quality. Thus, the control unit 6 implements control such that a periodic waveform to be newly inserted is determined taking into account fundamental periods that temporally precede and succeed that periodic waveform, thereby making the pitch variation smooth. In other words, the control unit 6 makes the former part of a periodic waveform to be newly inserted resemble the temporally preceding periodic waveform and makes the latter part of the new periodic waveform resemble the temporally succeeding periodic waveform. This may reduce degradation in sound quality resulting from waveform insertion. Specific processing performed by the control unit 6 may be realized by weighted addition on the input speech as expressed by:

$$y(t) = w_1(t) \times (t) + w_2(t) \times (t-L) \qquad (19)$$

where L represents the fundamental period, and $w_1(t)$ and $w_2(t)$ represent weight functions expressed by:

$$w_1(t) = \begin{cases} 1 & t \le t_1 - N/2 \\ \cos\left(\frac{t-(t_1-N/2)}{N} \cdot \frac{\pi}{2}\right) & t_1 - N/2 < t \le t_1 + N/2 \\ 0 & t > t_1 + N/2 \end{cases} \qquad (20)$$

$$w_2(t) = \begin{cases} 0 & t \le t_1 - N/2 \\ 1-\cos\left(\frac{t-(t_1-N/2)}{N} \cdot \frac{\pi}{2}\right) & t_1 - N/2 < t \le t_1 + N/2 \\ 1 & t > t_1 + N/2 \end{cases}$$

where $t_1$ represents the number of samples present where waveform is inserted, and N is the number of samples in the segment to be weighted, which may be the number of first samples in the nth frame, for example.

If the control unit 6 inserts multiple fundamental periods together, the insertion causes new periodicity and could result in degradation in sound quality. In order to avoid it, the control unit 6 may store a flag indicating whether insertion has been performed for each fundamental period in a buffer or memory not illustrated provided in the control unit 6. By referencing the buffer, the control unit 6 may control processing so that a fundamental period is not inserted immediately following an inserted fundamental period, thereby reducing degradation in sound quality.

Through the above-described process, the control unit 6 may extend the first vowel segment length or the second vowel segment length.

The control unit 6 outputs a control signal in which the first vowel segment length or the second vowel segment length of the input speech is controlled based on the fundamental period and the pitch variation rate, which is an example of the amount of acoustic feature, as output speech to the outside. The control unit 6 may output the output speech to a speaker not illustrated which is connected to or located in the speech processing device 1, for example.

The speech processing device according to the third embodiment enables a user's input speech to be better understood with reduced processing load in speech processing. Furthermore, by minimizing change in the waveform of input speech based on fundamental period and the amount of acoustic feature, high sound quality may be maintained.

Fourth Embodiment

Figure 12:
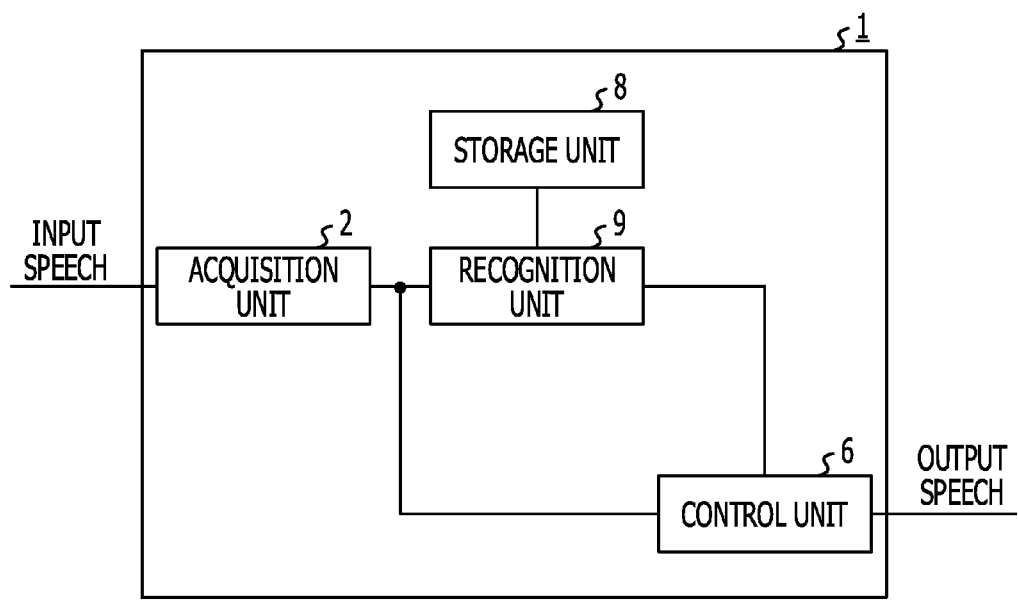
FIG. 12 is a functional block diagram of a speech processing device according to a fourth embodiment.

FIG. 12 is a functional block diagram of a speech processing device 1 according to a fourth embodiment. The speech processing device 1 includes an acquisition unit 2, a control unit 6, a storage unit 8, and a recognition unit 9. As the acquisition unit 2 and the control unit 6 have similar functions to the first embodiment, for example, their detailed descriptions are omitted.

The storage unit 8 is a storage device such as semiconductor memory elements such as flash memory, or a hard disk drive (HDD) or optical disk, for example. The storage unit 8 is not limited to these kinds of storage device but may be random access memory (RAM) or read-only memory (ROM) instead. In the storage unit 8, word dictionaries containing vowel segments, accent segments, and the like corresponding to text information are stored as desired, for example. The storage unit 8 does not have to be included in the speech processing device 1. Such data may be stored in a cache or memory not illustrated provided in functional units included in the speech processing device 1 in a distributed or centralized manner, for example. The storage unit 8 may also be provided in an external device outside the speech processing device 1 by using a communication unit not illustrated provided in the speech processing device 1 through a communication channel.

The recognition unit 9 is a hardware circuit composed of wired logic, for example. The recognition unit 9 may also be a functional module realized by a computer program executed in the speech processing device 1. The recognition unit 9 receives input speech from the acquisition unit 2. The recognition unit 9 recognizes the input speech as text information. Specifically, the recognition unit 9 determines the feature vector of the input speech and compares it with standard phoneme patterns prestored in a cache or memory not illustrated of the recognition unit 9 to thereby convert the input speech to text information. For recognition of input speech, the method described in Japanese Laid-open Patent Publication No. 4-255900 may be employed, for example. It is also possible to apply the speech recognition method described in Japanese Patent No. 5160594.

The recognition unit 9 references a word dictionary stored in the storage unit 8 and recognizes vowel segments and/or an accent segment corresponding to recognized text information. The recognition unit 9 is thereby able to recognize the first vowel segment length and the second vowel segment length. The recognition unit 9 outputs the first vowel segment length and the second vowel segment length to the control unit 6. For the speech processing device in the fourth embodiment, the detection unit 3, accent segment estimation unit 4, vowel segment length calculation unit 5, and feature calculation unit 7 of FIG. 1 or 11 may be combined as appropriate.

The speech processing device according to the fourth embodiment enables a user's input speech to be better understood with reduced processing load in speech processing. In addition, since the speech processing device according to the fourth embodiment defines the first vowel segment length and the second vowel segment length based on speech recognition, it may control the first vowel segment length or the second vowel segment length with increased accuracy.

Fifth Embodiment

Figure 13:
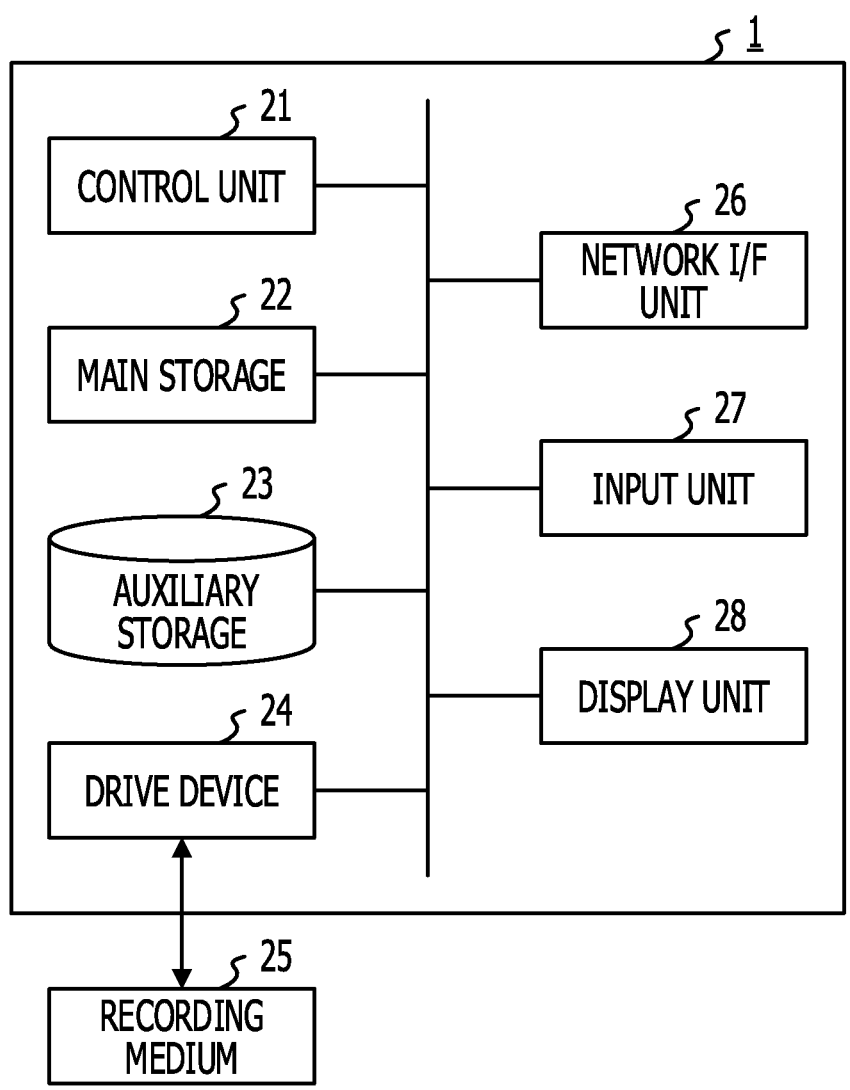
FIG. 13 illustrates a hardware configuration of a computer that functions as the speech processing device according to an embodiment.

FIG. 13 illustrates a hardware configuration of a computer that functions as the speech processing device 1 according to an embodiment. As depicted in FIG. 13, the speech processing device 1 includes a control unit 21, a main storage unit 22, an auxiliary storage unit 23, a drive device 24, network I/F unit 26, an input unit 27, and a display unit 28. The components are interconnected by a bus so that data may be input and output between them.

The control unit 21 is a CPU that controls devices and computes and processes data in the computer. The control unit 21 is also a computation device to execute programs stored in the main storage unit 22 and auxiliary storage unit 23, and also receives data from the input unit 27 or a storage device and performs computation or processing on the data before outputting it to the display unit 28 or a storage device.

The main storage unit 22 is a storage device such as ROM, RAM or the like for storing or temporarily saving programs like an OS, which is basic software, and application software to be executed by the control unit 21 and data.

The auxiliary storage unit 23 is a storage device such as an HDD to store data relating to application software and the like.

The drive device 24 reads a program from a recording medium 25, a flexible disk for example, and installs it in the auxiliary storage unit 23.

A predetermined program is stored in the recording medium 25 and the program stored in the recording medium 25 is installed into the speech processing device 1 by way of the drive device 24. After being installed, the program is executable by the speech processing device 1.

The network I/F unit 26 is an interface between the speech processing device 1 and a peripheral device having communication features connected over a network such as a local area network (LAN) or wide area network (WAN) formed of data transmission channels such as wired and/or wired lines.

The input unit 27 has a keyboard with cursor keys, keys for numerical input and other functions, a mouse, or a slice pad such as for selecting keys on a display screen of the display unit 28. The input unit 27 also serves as a user interface through which the user may give operational instructions to the control unit 21 or enter data.

The display unit 28 may be a cathode ray tube (CRT), an liquid crystal display (LCD) or the like, on which display is provided in response to display data input from the control unit 21.

The speech processing method described above may be realized as a program for execution by a computer. By the program being installed from a server or the like and executed by a computer, the speech processing method may be practiced.

It is also possible to realize the speech processing described above by recording the program in the recording medium 25 and causing the recording medium 25 to be read by a computer or a portable terminal. The recording medium 25 may be any of various kinds of recording media such as ones that records information optically, electrically, or magnetically, like a CD-ROM, flexible disk, and magneto-optical disk, or semiconductor memory that electrically records information like ROM and flash memory.

Sixth Embodiment

Figure 14:
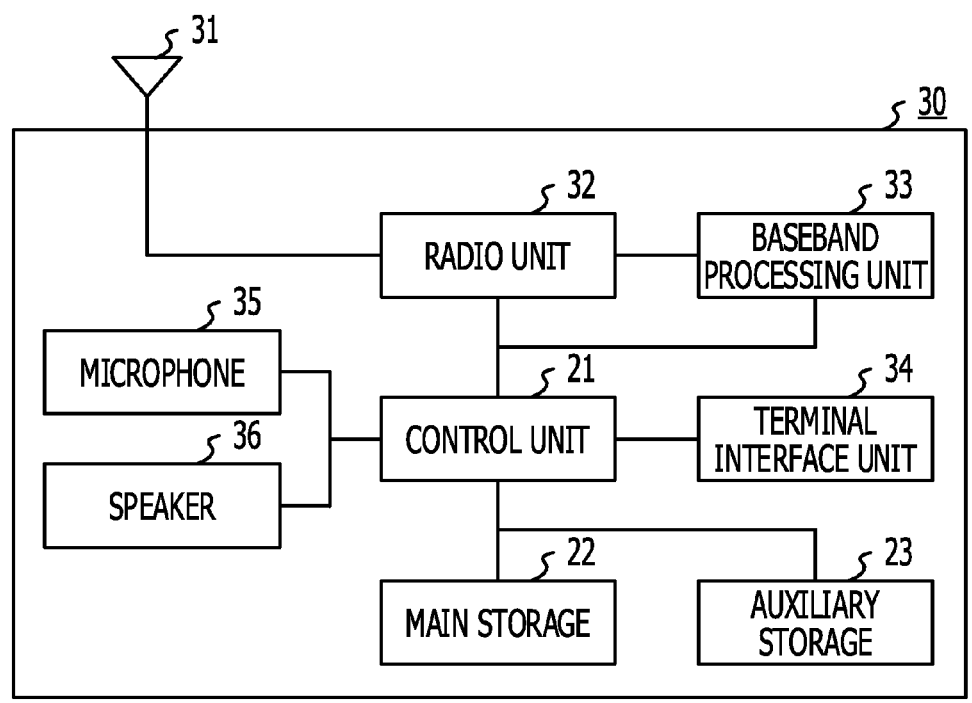
FIG. 14 illustrates a hardware configuration of a portable terminal device according to an embodiment.

FIG. 14 illustrates a hardware configuration of a portable terminal device 30 according to an embodiment. The portable terminal device 30 includes an antenna 31, a radio unit 32, a baseband processing unit 33, a control unit 21, a terminal interface unit 34, a microphone 35, a speaker 36, a main storage unit 22, and an auxiliary storage unit 23.

The antenna 31 transmits a radio signal amplified by a transmitting amplifier and receives radio signals from a base station. The radio unit 32 converts a transmit signal spread by the baseband processing unit 33 from digital to analog, converts the signal to a high frequency signal through quadrature modulation, and amplifies the resulting signal in a power amplifier. The radio unit 32 amplifies a received radio signal, converts the signal from analog to digital, and sends it to the baseband processing unit 33.

The baseband processing unit 33 performs baseband processes, such as addition of an error correction code to transmit data, data modulation, spread modulation, despreading of a received signal, decision of receiving conditions, threshold checks for channel signals, and error correction decoding.

The control unit 21 is responsible for radio control such as sending/receiving of control signals. The control unit 21 also executes a signal processing program stored such as in the auxiliary storage unit 23 to implement speech processing according to the first embodiment, for example.

The main storage unit 22 is a storage device such as ROM, RAM or the like for storing or temporarily saving programs like an OS, which is basic software, and application software to be executed by the control unit 21 and data.

The auxiliary storage unit 23 is a storage device such as an HDD or SSD to store data relating to application software and the like.

The terminal interface unit 34 performs data adapter handling and interfacing with a handset and an external data terminal.

The microphone 35 collects ambient sound including the speaker's voice as input and outputs it to the control unit 21 as a microphone signal. The speaker 36 outputs the signal output from the control unit 21 as output speech.

The components of the devices illustrated in figures do not have to be physically configured as depicted. That is, the specific form of distribution or integration of the components is not limited to the illustrated ones, but all or some of the components may be functionally or physically distributed or integrated in certain units as appropriate for various kinds of load and/or usage. The different processes described in the above embodiments may be implemented by executing a prepared program in a computer such as a personal computer or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A speech processing device comprising:
   a processor; and
   a memory which stores a plurality of instructions, which when executed by the processor, cause the processor to execute:
      obtaining input speech, the input speech including a plurality of vowel segments and a plurality of consonant segments,
      detecting the vowel segments contained in the input speech,
      estimating a stress segment among the plurality of vowel segments by comparing pitch variation rate or power variation rate per unit time of the plurality of vowel segments, respectively, the stress segment being a segment that has a strong trend of decrease in the pitch variation rate or the power variation rate per unit time,
      detecting sound lengths of each of the plurality of vowel segments,
      transforming the input speech so that a first sound length becomes longer than each of second sound lengths when the input speech includes at least one of the second sound lengths that is longer than the first sound length, the first sound length being a sound length of a vowel segment containing the stress segment, the second sound lengths being sound lengths of vowel segments excluding the stress segment, the transforming including extending the first sound length or shortening at least one of the second sound lengths, the first sound length being extended by inserting a part of segment obtained based on the vowel segment containing the stress segment into the vowel segment containing the stress segment, the at least one of the second sound lengths being shortened by deleting a part of segment from the at least one of the second sound lengths, a length to be inserted or to be shortened being determined based on the detected first sound length and the detected second sound length and a prescribed target scaling factor, and
      outputting the transformed input speech in which the first sound length is extended or in which the at least one of the second sound lengths is shortened.

2. The device according to claim 1, wherein the estimating comprises estimating the stress segment based on an amount of change of a pitch frequency or power of the input speech per unit time.

3. The device according to claim 1, wherein the memory further causes the processor to execute detecting a fundamental period for a vowel segment to be extended or to be shortened in the transforming,
   wherein, in the transforming, the length to be inserted or to be shortened is determined based on the fundamental period.

4. The device according to claim 3, wherein the detecting the fundamental period comprises further detecting an amount of acoustic feature that includes at least one of pitch frequency, formant frequency, and autocorrelation of the vowel segment to be extended or to be shortened in the transforming, and
   wherein the transforming comprises extending the first sound length or shortening the second sound length, when it is determined that the vowel segment to be extended or to be shortened in the transforming is a segment for which the amount of change of the amount of acoustic feature per unit time is less than a predetermined first threshold.

5. The device according to claim 1, wherein the transforming comprises transforming the first sound length or the second sound length when it is determined that the vowel segment to be extended or to be shortened in the transforming is a segment for which the autocorrelation value is equal to or greater than a predetermined threshold or when it is determined that the vowel segment to be extended or to be shortened in the transforming is a segment for which amplitude is less than a predetermined threshold.

6. The device according to claim 1, wherein the transforming comprises extending the first sound length or shortening the second sound length by adding a signal in which a weighting factor that decreases over time is applied to a segment preceding the part of the segment to be inserted or shortened, and a signal in which a weighting factor that increases over time is applied to a frame following the part of segment to be inserted or shortened.

7. The device according to claim 1, wherein the memory further causes the processor to execute recognizing the input speech as text information,
   wherein the recognizing comprises detecting the first sound length or the second sound length based on the text information.

8. A speech processing method comprising:
   obtaining input speech, the input speech including a plurality of vowel segments and a plurality of consonant segments,
   detecting the vowel segments contained in the input speech,
   estimating a stress segment among the plurality of vowel segments by comparing pitch variation rate or power variation rate per unit time of the plurality of vowel segments, respectively, the stress segment being a segment that has a strong trend of decrease in the pitch variation rate or the power variation rate per unit time,
   detecting sound lengths of each of the plurality of vowel segments,
   transforming the input speech so that a first sound length becomes longer than each of second sound lengths when the input speech includes at least one of the second sound lengths that is longer than the first sound length, the first sound length being a sound length of a vowel segment containing the stress segment, the sec- ond sound lengths being sound lengths of vowel segments excluding the stress segment, the transforming including extending the first sound length or shortening at least one of the second sound lengths, the first sound length being extended by inserting a part of segment obtained based on the vowel segment containing the stress segment into the vowel segment containing the stress segment, the at least one of the second sound lengths being shortened by deleting a part of segment from the at least one of the second sound lengths, a length to be inserted or to be shortened being determined based on the detected first sound length and the detected second sound length and a prescribed target scaling factor, and outputting the transformed input speech in which the first sound length is extended or in which the at least one of the second sound lengths is shortened.

9. The method according to claim 8, wherein the estimating comprises estimating the stress segment based on an amount of change of a pitch frequency or power of the input speech per unit time.

10. The method according to claim 8, further comprising:
detecting a fundamental period for a vowel segment to be extended or to be shortened in the transforming,
wherein, in the transforming, the length to be inserted or to be shortened is determined based on the fundamental period.

11. The method according to claim 10, wherein the detecting the fundamental period comprises further detecting an amount of acoustic feature that includes at least one of pitch frequency, formant frequency, and autocorrelation of the vowel segment to be extended or to be shortened in the transforming, and
wherein the transforming comprises extending the first sound length or shortening the second sound length, when it is determined that the vowel segment to be extended or to be shortened in the transforming is a segment for which the amount of change of the amount of acoustic feature per unit time is less than a predetermined first threshold.

12. The method according to claim 8, wherein the transforming comprises transforming the first sound length or the second sound length when it is determined that the vowel segment to be extended or to be shortened in the transforming is a segment for which the autocorrelation value is equal to or greater than a predetermined threshold or when it is determined that the vowel segment to be extended or to be shortened in the transforming is a segment for which amplitude is less than a predetermined threshold.

13. A non-transitory computer-readable storage medium storing a speech processing program that causes a computer to execute a process comprising:
obtaining input speech, the input speech including a plurality of vowel segments and a plurality of consonant segments,
detecting the vowel segments contained in the input speech,
estimating a stress segment among the plurality of vowel segments by comparing pitch variation rate or power variation rate per unit time of the plurality of vowel segments, respectively, the stress segment being a segment that has a strong trend of decrease in the pitch variation rate or the power variation rate per unit time,
detecting sound lengths of each of the plurality of vowel segments,
transforming the input speech so that a first sound length becomes longer than each of second sound lengths when the input speech includes at least one of the second sound lengths that is longer than the first sound length, the first sound length being a sound length of a vowel segment containing the stress segment, the second sound lengths being sound lengths of vowel segments excluding the stress segment, the transforming including extending the first sound length or shortening at least one of the second sound lengths, the first sound length being extended by inserting a part of segment obtained based on the vowel segment containing the stress segment into the vowel segment containing the stress segment, the at least one of the second sound lengths being shortened by deleting a part of segment from the at least one of the second sound lengths, a length to be inserted or to be shortened being determined based on the detected first sound length and the detected second sound length and a prescribed target scaling factor, and
outputting the transformed input speech in which the first sound length is extended or in which the at least one of the second sound lengths is shortened.

14. A portable terminal device comprising:
a microphone that inputs a speaker's voice as input speech;
a processor; and
a memory which stores a plurality of instructions, which when executed by the processor, cause the processor to execute:
obtaining the input speech, the input speech including a plurality of vowel segments and a plurality of consonant segments,
detecting the vowel segments contained in the input speech,
estimating a stress segment among the plurality of vowel segments by comparing pitch variation rate or power variation rate per unit time of the plurality of vowel segments, respectively, the stress segment being a segment that has a strong trend of decrease in the pitch variation rate or the power variation rate per unit time,
detecting sound lengths of each of the plurality of vowel segments,
transforming the input speech so that a first sound length becomes longer than each of second sound lengths when the input speech includes at least one of the second sound lengths that is longer than the first sound length, the first sound length being a sound length of a vowel segment containing the stress segment, the second sound lengths being sound lengths of vowel segments excluding the stress segment, the transforming including extending the first sound length or shortening at least one of the second sound lengths, the first sound length being extended by inserting a part of segment obtained based on the vowel segment containing the stress segment into the vowel segment containing the stress segment, the at least one of the second sound lengths being shortened by deleting a part of segment from the at least one of the second sound lengths, a length to be inserted or to be shortened being determined based on the detected first sound length and the detected second sound length and a prescribed target scaling factor, and
outputting the transformed input speech in which the first sound length is extended or in which the at least one of the second sound lengths is shortened,
a speaker configured to output an output speech generated by controlling the input speech.

* * * * *